US010972768B2

(12) United States Patent
Zou et al.

(10) Patent No.: US 10,972,768 B2
(45) Date of Patent: Apr. 6, 2021

(54) DYNAMIC REBALANCING OF EDGE RESOURCES FOR MULTI-CAMERA VIDEO STREAMING

(71) Applicant: Intel Corporation, Santa Clara, CA (US)

(72) Inventors: Yi Zou, Portland, OR (US); Mohammad Ataur Rahman Chowdhury, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/457,836

(22) Filed: Jun. 28, 2019

(65) Prior Publication Data

US 2019/0327506 A1    Oct. 24, 2019

Related U.S. Application Data

(60) Provisional application No. 62/867,837, filed on Jun. 27, 2019.

(51) Int. Cl.
*H04N 21/2343* (2011.01)
*H04N 21/63* (2011.01)
(Continued)

(52) U.S. Cl.
CPC ........... *H04N 21/234345* (2013.01); *H04N 21/23406* (2013.01); *H04N 21/42692* (2013.01); *H04N 21/632* (2013.01)

(58) Field of Classification Search
CPC ..... H04N 21/234345; H04N 21/23406; H04N 21/42692; H04N 21/632
See application file for complete search history.

(56) References Cited

U.S. PATENT DOCUMENTS

2007/0288638 A1* 12/2007 Vuong ............... H04L 67/1093
709/226
2009/0119734 A1* 5/2009 Deshpande ........ H04N 21/6125
725/118
(Continued)

OTHER PUBLICATIONS

Apple Developer Documentation, "Understanding the HTTP Live Streaming Architecture", accessed at https://developer.apple.com/documentation/http_live_streaming/understanding_the_http_live_streaming_architecture on Feb. 5, 2020, 2 pages.
(Continued)

*Primary Examiner* — Arvin Eskandarnia
*Assistant Examiner* — Chhian (Amy) Ling
(74) *Attorney, Agent, or Firm* — Alliance IP, LLC

(57) ABSTRACT

In one embodiment, an edge compute node comprises processing circuitry to: receive an incoming video stream captured by a camera, wherein the incoming video stream comprises a plurality of video segments; store the plurality of video segments in a receive buffer in a memory; perform a visual computing task on a first video segment in the receive buffer; detect a resource overload on the edge compute node; receive load information corresponding to a plurality of peer compute nodes; select a peer compute node to perform the visual computing task on a second video segment in the receive buffer; replicate the second video segment from the edge compute node to the peer compute node; and receive a compute result from the peer compute node, wherein the compute result is based on the peer compute node performing the visual computing task on the second video segment.

25 Claims, 10 Drawing Sheets

(51) Int. Cl.
*H04N 21/426* (2011.01)
*H04N 21/234* (2011.01)

(56) References Cited

U.S. PATENT DOCUMENTS

| | | | | |
|---|---|---|---|---|
| 2011/0142064 A1* | 6/2011 | Dubai | ............... | H04L 47/125 |
| | | | | 370/412 |
| 2011/0202925 A1 | 8/2011 | Banerjee et al. | | |
| 2011/0289333 A1 | 11/2011 | Hoyer et al. | | |
| 2012/0195363 A1* | 8/2012 | Laganiere | ............... | H04N 19/85 |
| | | | | 375/240.01 |
| 2016/0269239 A1 | 9/2016 | Ashby, Jr. et al. | | |
| 2017/0255559 A1* | 9/2017 | Burstein | ............... | G06F 3/0659 |
| 2018/0059966 A1* | 3/2018 | Lee | ............... | G06F 3/0685 |
| 2018/0152390 A1 | 5/2018 | Loomba et al. | | |
| 2018/0241836 A1* | 8/2018 | Arsenault | ............ | H04L 65/4084 |
| 2019/0158422 A1 | 5/2019 | Greenwood et al. | | |
| 2019/0303221 A1* | 10/2019 | Masputra | ............. | G06F 3/0631 |

OTHER PUBLICATIONS

CCTV Advisory Service, "Transmission of Video Signals", accessed at https://www.cctv-information.co.uk/i/Transmission_of_Video_Signals, Jan. 16, 2009, 24 pages.
Huawei Technologies Co., Ltd., "Huawei Video Cloud Storage Solution Technical White Paper", Issue 01, Mar. 26, 2015, 45 pages.
Lederer, Stefan, "Optimal Adaptive Streaming Formats MPEG-DASH & HLS Segment Length", accessed at https://bitmovin.com/mpeg-dash-hls-segment-length/, updated Apr. 9, 2015, 10 pages.
Motion Imagery Standards Board, "Recommended Practice: H.264 Bandwidth/Quality/Latency Tradeoffs", accessed at https://gwg.nga.mil/misb/docs/rp/RP0904.1.pdf, updated Feb. 27, 2014, 17 pages.
Sefton, Eric, et al., "Video Streaming with SP and SI Frames", IEEE Visual Communications and Image Processing, Jul. 2005, Beijing, China, 8 pages.
The Ben Software Blog, "Comparison of Streaming Formats", accessed at https://bensoftware.com/blog/comparison-of-streaming-formats/, updated Feb. 19, 2013, 10 pages.
PCT International Search Report and Written Opinion issued in PCT/US2020/025060, dated Jul. 15, 2020; 14 pages.

* cited by examiner

DYNAMIC REBALANCING OF EDGE RESOURCES FOR MULTI-CAMERA VIDEO STREAMING

CROSS-REFERENCE TO RELATED APPLICATIONS

This patent application claims the benefit of the filing date of the following patent application, the content of which is hereby expressly incorporated by reference: U.S. Patent Application Ser. No. 62/867,837, filed on Jun. 27, 2019, entitled "VISUAL FOG ORCHESTRATION."

FIELD OF THE SPECIFICATION

This disclosure relates in general to the field of visual computing, and more particularly, though not exclusively, to dynamically rebalancing edge resources for multi-camera video streaming.

BACKGROUND

In many video streaming architectures, a collection of cameras captures and streams video to dedicated servers, which are each responsible for processing the video streams from a predefined number or subset of the cameras. However, the bandwidth and computation requirements for each server can vary dramatically based on various factors, such as the technical characteristics and/or configurations of the corresponding cameras, the underlying video content captured by those cameras, and so forth. As a result, it is common for some servers to become computationally overloaded while others are underutilized, which inevitably leads to dropped video frames and poor quality of service (QoS).

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
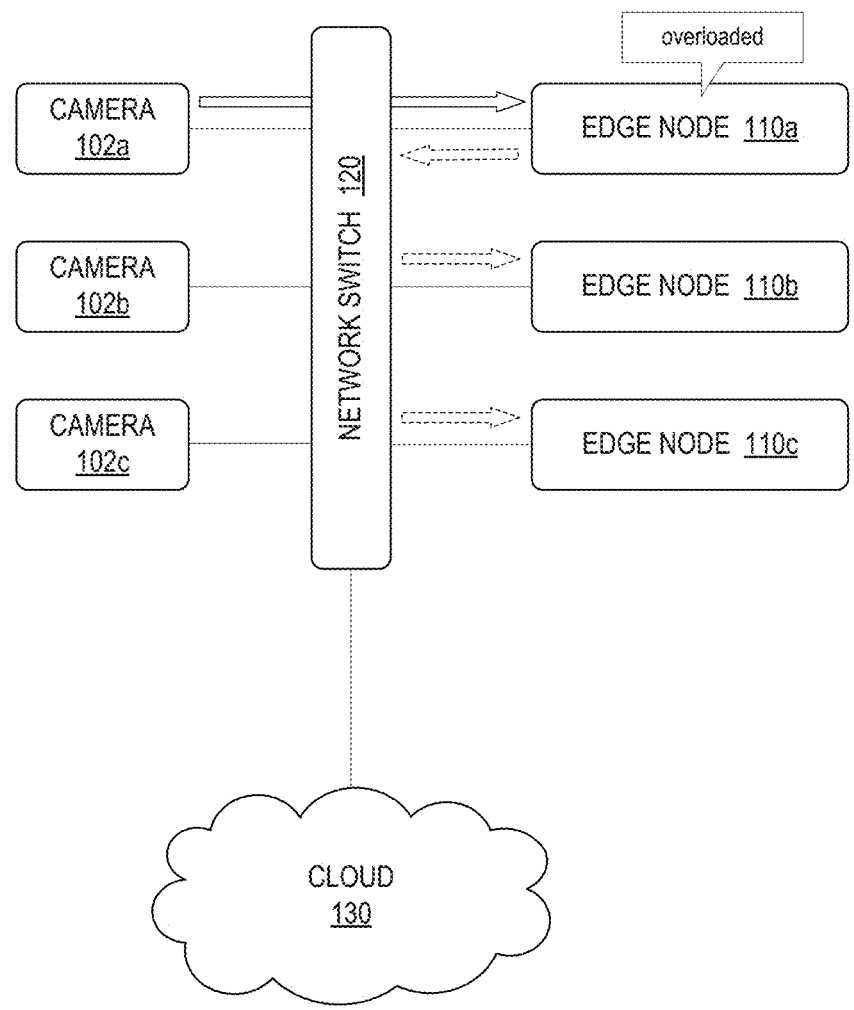
FIG. 1 illustrates an example of a video streaming system in accordance with certain embodiments.

This patent application claims the benefit of the filing date of the following patent application, the content of which is hereby expressly incorporated by reference: U.S. Patent Application Ser. No. 62/867,837, filed on Jun. 27, 2019, entitled "VISUAL FOG ORCHESTRATION."

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Dynamic Rebalancing of Edge Resources for Multi-Camera Video Streaming

FIG. 1 illustrates an example of a video streaming system 100 in accordance with certain embodiments. In the illustrated embodiment, video streaming system 100 includes a collection of cameras 102a-c that are connected to edge nodes 110a-c (e.g., edge computing servers, edge processing devices) via a network switch 120, which is further connected to the cloud 130 (e.g., via one or more communication networks). The cameras 102a-c capture video footage of their respective surroundings, and that video footage is then streamed to the edge nodes 110a-c (e.g., via the network switch 120) for further processing. If one of the edge nodes 110a-c becomes overloaded, however, a portion of its video processing workload can be dynamically offloaded to other edge nodes 110a-c to prevent video frames from being dropped, as described further below.

The edge nodes 110a-c can include any computing devices or hardware components connected at or near the edge of a communications network, such as edge computing servers or edge processing devices connected to the same local network as the cameras 102a-c, or processing devices integrated within the cameras 102a-c, among other examples. In other embodiments, however, the functionality of video streaming system 100 and/or edge nodes 110a-c can be distributed across any combination of devices and components deployed throughout an edge-to-cloud network topology, including at the edge, in the cloud, and/or anywhere in between in the "fog." For example, the video processing and offloading functionality can be performed by any combination of cameras 102a-c, edge nodes 110a-c, fog nodes, and/or the cloud 130.

Figure 2:
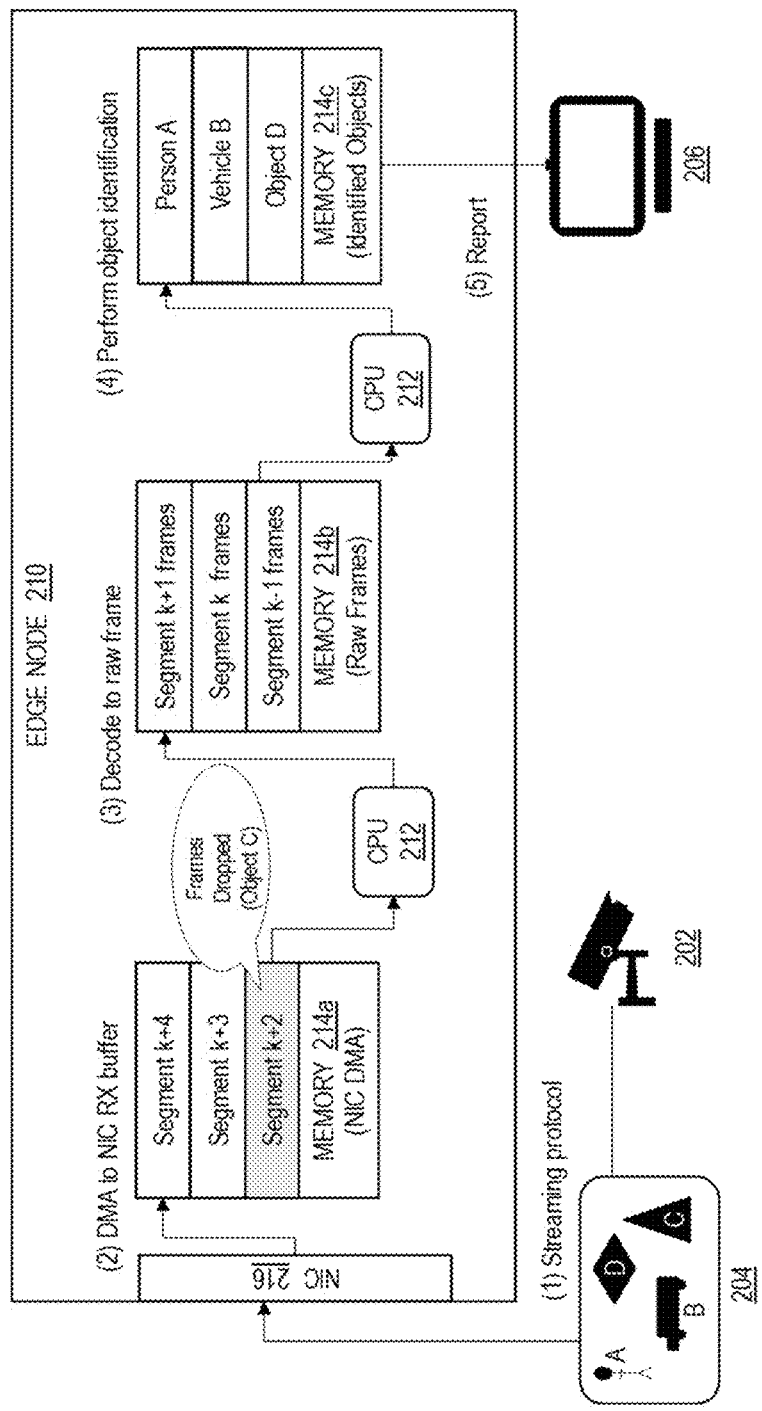
FIG. 2 illustrates an example embodiment of an edge video streaming architecture that drops frames.

In many video streaming architectures, edge compute servers are assigned to a predefined number of cameras to perform computational tasks, such as feature extraction, event detection, object identification, target tracking, and so forth. However, the bandwidth and computation requirements for each edge compute server can vary dramatically depending on the video content that a particular edge server is receiving from its corresponding cameras. For example, at the intersection of a small street and a main road, video captured by a camera facing the main road will typically require more processing than video captured by a camera facing the small street, particularly during peak business hours. Moreover, different cameras often have different characteristics, such as picture quality, streaming requirements, and so forth, which means they will produce video streams that have different compute requirements. As a result, it is common for some edge compute servers to be computationally overloaded while others are underutilized, which inevitably leads to dropped video frames (e.g., as illustrated in FIG. 2).

For example, when an edge compute server becomes overloaded, it may resort to blindly dropping video frames to reduce its processing burden. While this approach is effective at reducing the processing burden on the edge compute server, video frames are often dropped after they have already been decoded, which is a significant waste of resources at the edge. Moreover, dropping video frames also introduces information loss, which can potentially break service level agreements (SLAB) and may have drastic consequences for certain applications or use cases. In some cases, for example, dropped frames may be essential to detecting emergencies, such as traffic accidents, crimes (e.g., robberies/burglaries), and/or other potential life-threatening events.

While certain approaches can be leveraged to reduce video frame loss, they suffer from various shortcomings.

In some cases, for example, load balancing may be leveraged to improve quality of service (QoS). Load balancing solutions can be implemented at various different levels. In particular, many web servers (e.g., NGINX, Apache, Microsoft IIS, common web proxy services) include a load balancer as a feature to balance hypertext transfer protocol (HTTP) requests. At the data link layer (e.g., layer 2 (L2) of the Open Systems Interconnection (OSI) model), there are standards designed to facilitate NIC endpoint-to-endpoint reliable non-drop packet behavior by imposing carefully calculated hardware (HW) packet buffer configuration parameters (e.g., the IEEE Data Center Bridging (DCB) standard). At the operating system (OS) level, various scheduler algorithms exist to balance CPU-centric tasks, particularly with respect to multi-core architectures. These load balancing approaches are generally designed to work at a fixed point in the pipeline of an end-to-end application, such as the OSI L2 (e.g., data link layer) or L3 (e.g., network layer) protocol levels. These load balancing approaches will not be as effective for a video analytics pipeline, however, as the compute load is dependent on the underlying video content, which is not known at the networking level or the decoding/transcoding level.

As another example, some solutions may rely on camera-side buffering and retransmission when the receive side at the edge compute server is overloaded. Camera-side buffering is essentially an over-provisioning approach that requires extra storage resources on the camera side, which increases the total cost of ownership (TCO) on the camera side. For example, the storage device used on the camera side can be very costly depending on its capacity, form factor, operating temperature/humidity, and so forth. Moreover, this approach is not scalable due to the number and variety of cameras that are typically involved.

Another approach is to reduce the compute quality at overloaded edge compute servers, such as by processing video streams using lower resolutions and/or less complex algorithms (e.g., a CNN algorithm with fewer layers). Reducing the compute quality is undesirable, however, as it produces higher-error results that can be disastrous for detecting critical events. Moreover, as a practical matter, it is not easy to tune the compute quality in real time. While lowering the resolution may be tolerable in some cases, such as for a video streaming service that replays live news or concerts, it still faces the same type of information loss that is undesirable and/or unacceptable for critical event detection applications.

Another approach is to push video frames to the cloud for processing at a later time. While this approach may be tolerable for video content that is not time critical, it is not suitable for video content that needs to be processed in real time. For example, the latency required to transmit video content from the edge to the cloud through a wide area network (WAN) precludes the video content from being processed in real time, which means any time-sensitive processing (e.g., real-time critical event detection) must be performed at the edge. Additionally, pushing unprocessed video to the cloud requires significant amounts of bandwidth, which substantially increases bandwidth costs. Accordingly, this approach is not helpful for real-time processing that needs to be performed at the edge, as the cloud is typically limited to providing long-term data storage (e.g., for archiving and retention purposes) to allow local storage at the edge to be reclaimed.

Accordingly, in the illustrated embodiment, video streaming system 100 leverages a visual computing architecture that enables edge nodes 110*a-c* (e.g., edge computing servers) to avoid dropping incoming video frames even under heavy loads (e.g., by dynamically rebalancing the video stream processing among edge nodes), while continuing to perform computation tasks (e.g., video analytics) at the edge.

In some embodiments, for example, edge nodes 110*a-c* may be implemented with the following capabilities:

(i) Low-latency persistent storage (e.g., 3D XPoint-based memory, such as Intel Optane DC Persistent Memory) to store incoming video stream segments that have not yet been processed due to insufficient compute or memory resources in real time;

(ii) A scalable dynamic replication peer selection algorithm based on the real-time load status from all edge compute server nodes, where load status is shared using common mechanism such as broadcast/multicast of heart-beat messages; and (iii) Fast data replication among edge compute nodes over a local network to redirect previously-staged video segment data from overloaded edge compute nodes to non-overloaded edge compute nodes.

In this manner, an overloaded edge node 110*a-c* can (i) store unprocessed video segments that would otherwise be dropped in the low-latency persistent storage, (ii) select a peer node 110*a-c* to handle the processing of the unprocessed video segments, and (iii) rapidly replicate the unprocessed video segments to the selected peer node 110*a-c*.

The described solution provides various advantages. For example, this solution ensures that no video frames are dropped by edge compute nodes for real-time video streaming applications. Video analytics is one of the most important applications of edge computing for communication service providers (e.g., telecom providers) and cloud service providers. This novel architecture for video analytics at the edge helps these service providers satisfy or exceed service level agreements (SLAB) that are otherwise difficult to satisfy due to unpredicted workload patterns in video content from different camera sources. Accordingly, this architecture greatly improves the level of service that these service providers can offer to customers with video streaming applications.

This solution also takes advantage of low-latency persistent storage (e.g., 3D XPoint persistent memory) and showcases how it can be applied to edge computing architectures. Low-latency persistent storage is particularly well-suited for the purpose of locally persisting video streams at the edge when edge compute nodes are overloaded.

This solution also reduces the total cost of ownership (TCO) for visual computing architectures that commonly depend on overprovisioning of both memory and compute resources. For example, this solution leverages edge nodes to handle the processing of large volumes of video data in a timely manner, thus avoiding the latency and bandwidth costs associated with transmitting the video data to the cloud. When faced with the potential loss of video content due to overloaded resources, however, users often turn to overprovisioning memory and compute resources, both in the cloud and at the edge. This solution uses low-latency persistent storage to avoid overprovisioning of more costly memory and compute resources, thus greatly reducing the TCO.

Additional functionality and embodiments are described further in connection with the remaining FIGURES. Accordingly, it should be appreciated that visual streaming system 100 of FIG. 1 may be implemented with any aspects of the embodiments described throughout this disclosure.

FIG. 2 illustrates an example embodiment of an edge video streaming architecture 200 that drops frames. In the illustrated embodiment, for example, an edge node 210 (e.g., an edge compute server) is performing object identification and tracking on a video stream 204 captured by a camera 202, but certain video frames are dropped when edge node 210 becomes overloaded.

In the illustrated example, the process flow for performing object identification and tracking on edge video streaming architecture 200 includes the following steps:

(1) A camera 202 captures video 204 of a scene containing objects A, B, C, and D, and the camera 202 uses a streaming protocol to stream the video 204 to an edge node 210 in real time.

(2) The video stream 204 is then streamed into the edge node 210 for processing. For example, the video stream 204 is received by a network interface controller (NIC) 216 of the edge node 210, and then stored in memory 214a of the edge node 210 as video segments. The size of the video segments may vary depending on the particular streaming protocol employed, but they generally have a length of approximately 3-10 seconds.

(3) The central processing unit (CPU) 212 of the edge node 210 decodes each segment and stores the raw decoded frames from each segment in memory 214b.

(4) The CPU 212 then performs the computation tasks for object identification and tracking over the raw frames in memory 214b, and the identified objects (e.g., person A, vehicle B, object D) are stored back in memory 214c as metadata.

(5) The edge node 210 then sends the results (e.g., the metadata associated with the identified objects) to a management interface 206 for further processing and/or auditing.

In the illustrated example, however, the edge node 210 becomes overloaded and is forced to drop video segment k+2, which contains the video frames corresponding to object C. For example, assume object C is only captured in the frames of video segment k+2, while objects A, B, and D are captured in the frames of other video segments. In the illustrated example, video segments k+2, k+3, and k+4 are pending in the receive buffer 214a, while the raw decoded frames for video segments k−1, k, and k+1 are pending in the raw frame buffer 214b. Meanwhile, the CPU 212 becomes overloaded, as it is still processing the raw frames for segment k−1 while the NIC 216 continues to receive new video segments (e.g., segments k+4, k+5, and so forth). To allow the NIC 216 to continue receiving new video segments, segment k+2 is discarded from the receive buffer 214a. As a result, object C is unavoidably missed when performing object identification and tracking, as object C was captured in the frames of the discarded segment k+2.

Figure 3:
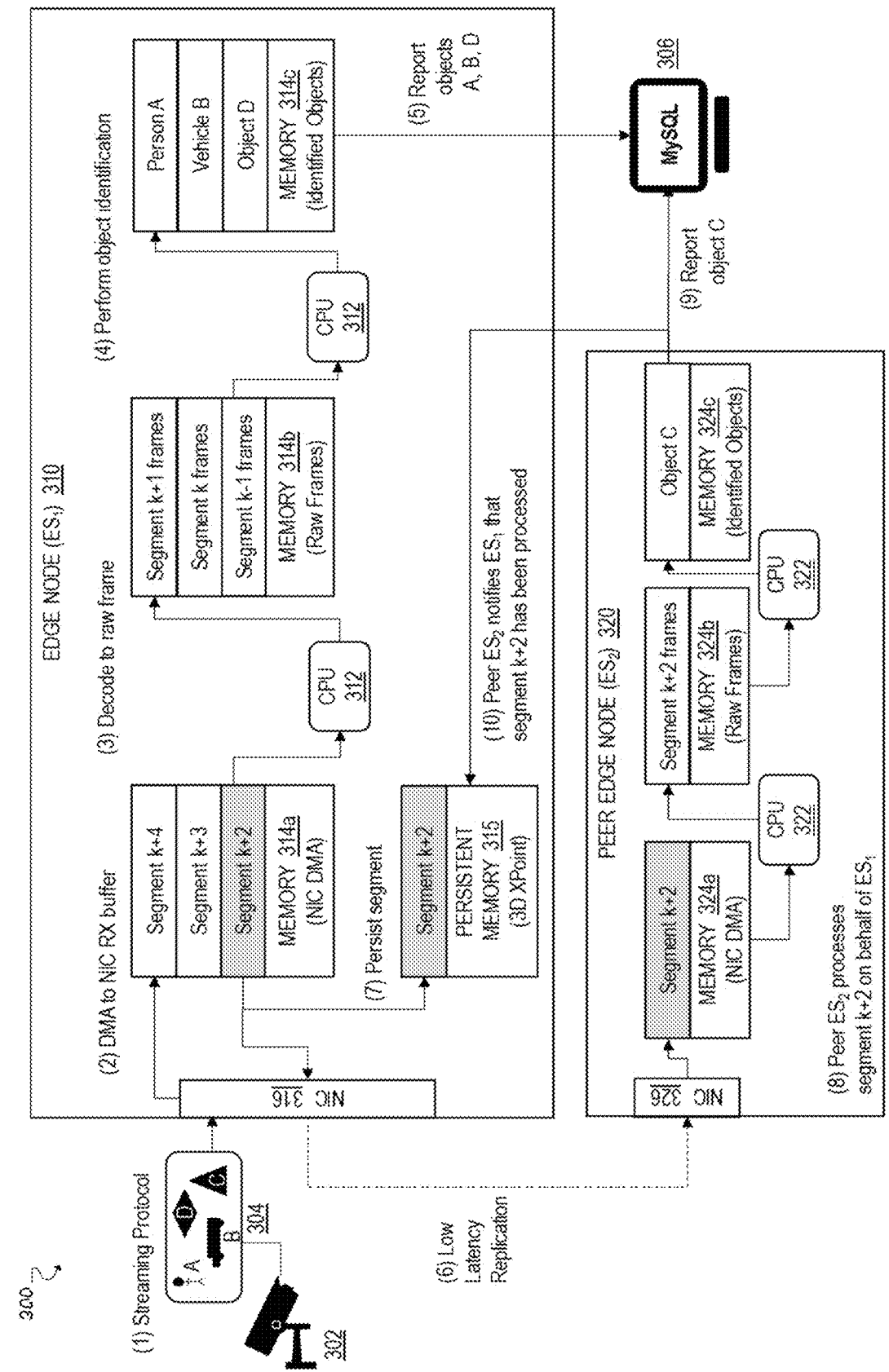
FIG. 3 illustrates an example embodiment of an edge video streaming architecture that leverages dynamic resource rebalancing to avoid dropping frames.

FIG. 3 illustrates an example embodiment of an edge video streaming architecture 300 that leverages dynamic resource rebalancing to avoid dropping frames. In the illustrated embodiment, for example, an edge node 310 (e.g., edge server $ES_1$) is performing object identification and tracking on a video stream 304 captured by a camera 302, but as the edge node 310 becomes overloaded, it offloads the processing of certain video frames to another peer edge node 320 (e.g., edge server $ES_2$) to avoid dropping the frames.

In the illustrated example, the process flow for performing object identification and tracking on edge video streaming architecture 300 involves the following steps:

(1) A camera 302 captures video 304 of a scene containing objects A, B, C, and D, and the camera 302 uses a streaming protocol to stream the video 304 to an edge node 310 ($ES_1$) in real time.

(2) The video stream 304 is then streamed into edge node 310 ($ES_1$) for processing. In particular, the video stream 304 is received by a network interface controller (NIC) 316 of edge node 310 ($ES_1$), and then stored in memory 314a of edge node 310 ($ES_1$) as video segments using direct memory access (DMA). In some embodiments, for example, the network hardware (HW) and software (SW) stack on edge node 310 ($ES_1$) uses direct memory access (DMA) to store incoming packet video data 304 in a receive (Rx) packet buffer in system memory 314a. Moreover, based on the streaming protocol, the packet payloads are organized and assembled into video segments in the receive (Rx) packet buffer 314a for subsequent decoding/transcoding.

(3) The CPU 312 of edge node 310 ($ES_1$) then performs a decoding task to decode each encoded video segment in the receive buffer 314a into raw video frames (e.g., using an H.264 codec), which are then stored in a raw video frame buffer in system memory 314b.

(4) The CPU 312 of edge node 310 ($ES_1$) then performs compute tasks associated with object identification and tracking (e.g., using standard machine learning and/or statistical algorithms and tools) on the raw frames stored in the video frame buffer in system memory 314b. The objects that are identified (e.g., person A, vehicle B, object D) and any related information (e.g., tracking predictions) are output as metadata, which is stored in system memory 314c for subsequent reporting.

(5) The metadata associated with the identified objects is then fed to a management server instance 306 (e.g., a MySQL server) to properly store and report the results.

(6) Edge node 310 ($ES_1$) becomes overloaded while processing the frames for video segments k−1 to k+1 (e.g., due to those frames containing underlying video content that requires more processing than usual). Accordingly, edge node 310 ($ES_1$) uses a peer selection algorithm (e.g., described below) to select a peer edge node 320 ($ES_2$) to handle the processing of video segment k+2 (e.g., the next video segment to be processed in the receive buffer 314a). Edge node 310 ($ES_1$) then replicates video segment k+2 to peer edge node 320 ($ES_2$) (e.g., as described below) for processing.

(7) Edge node 310 ($ES_1$) also persistently stores video segment k+2 in low-latency persistent memory 315 (e.g., 3D XPoint persistent memory) before reclaiming the corresponding memory 314a in the receive buffer. In this manner, video segment k+2 is made durable locally and can be recovered later in the event edge node 310 ($ES_1$) or edge node 320 ($ES_2$) crashes.

(8) Peer edge node 320 (ES$_2$) receives the replicated video segment k+2 from edge node 310 (ES$_1$), and peer edge node 320 (ES$_2$) performs the requisite compute tasks on that video segment (e.g., object identification and tracking) on behalf of edge node 310 (ES$_1$).

(9) Peer edge node 320 (ES$_2$) reports its compute results (e.g., identified object C) to the management MySQL server 306.

(10) Peer edge node 320 (ES$_2$) then notifies edge node 310 (ES$_1$) that video segment k+2 has been processed, and edge node 310 (ES$_1$) can then reclaim the persistent memory 315 that was used to store video segment k+2.

As noted above, when an edge node 310 becomes overloaded, it uses a peer selection algorithm to select a peer edge node 320 to handle the processing of certain video segment(s), which are replicated from the original edge node 310 to the peer edge node 320. The peer selection algorithm uses the load status of all available edge nodes to select the appropriate peer node to handle the offloaded processing and rebalance the overall processing load. Accordingly, load status information must be collected from all edge nodes. For example, all edge compute nodes involved in this collaborative video analytics pipeline must share their system load status to allow overloaded edge nodes to choose optimal peer edge nodes for offloading compute tasks and rebalancing the overall load.

Any suitable approach can be used to share load status information among edge nodes. In some embodiments, for example, each edge node may periodically broadcast or multicast a "heartbeat" that indicates its current load status. Alternatively, edge nodes may use a shared distributed in-memory key-value (KV) store or cache (e.g., memcached or Apache ZooKeeper) to collect and share load status information.

An example peer selection algorithm is described below. However, it should be appreciated that this peer selection algorithm is merely presented as an example, as other peer selection algorithms can also be used.

In this example peer selection algorithm, assume the set of edge server nodes is denoted as E={ES$_1$, ES$_2$, . . . , ES$_n$} with total of n=|E| edge server nodes. In addition, assume the load for an edge server ES$_i$ is denoted as L$_i$, i=1 . . . n. The process for an overloaded edge server ES$_i$ to select a peer to handle the processing of certain replicated video segment(s) involves the following steps:

(1) Collect the load status L$_i$ from the most recent timestamp t from all edge servers. If the load status for an edge server has not yet been received for timestamp t, then use the load status from timestamp t−1 for that edge server.

(2) Generate an ordered set E' from E with the load sorted from low to high. For example, assuming E={ES$_1$:L$_1$=50%, ES$_2$:L$_2$=70%, ES$_3$:L$_3$=40%, ES$_4$:L$_4$=60%, ES$_5$:L$_5$=90%}, then E'={ES$_3$:L$_3$=40%, ES$_1$:L$_1$=50%, ES$_4$:L$_4$=60%, ES$_2$:L$_2$=70%, ES$_5$:L$_5$=90%}.

(3) Generate the peer selection set E$_p$ as a subset of E', where E$_p$ contains the first m elements from E'. The value of m is a preconfigured load balancing factor that can changed at runtime. As an example, if the total number of edge nodes is 10, then m may be set to a value of 4 (e.g., m=4 for n=10). This allows the load to be distributed evenly without potentially overloading other servers. Thus, |E$_p$|=m<=|E'|=n, and E$_p$ is defined as:

$$E_p=\{ES_k, \text{ where for all } ES_i \text{ in } E'-E_p, L_i > L_k\}. \quad (1)$$

(4) Calculate average load L$_p$ from the peer selection set E$_p$:

$$L_p = \Sigma L_k / |E_p|, \text{ for all } ES_k \text{ in } E_p. \quad (2)$$

(5) Select the replication peer node ES$_r$ whose load has the minimal distance to the average load (L$_p$) of the peer selection set (E$_p$):

$$ES_r \text{ in } E_p \text{ where } \|L_r - L_p\| = \min\{\|L_k - L_p\|\} \text{ for all } ES_k \text{ in } E_p. \quad (3)$$

The above replication peer selection algorithm is designed to allow an overloaded edge server to select a peer ES$_r$ that has enough load to spare, while simultaneously avoiding the scenario where ES$_r$ becomes overloaded due to a burst of replication requests from multiple overloaded edge compute servers. For example, the algorithm limits the peer node candidates to a smaller peer selection set (E$_p$) and chooses the node whose load is the closest to the average load (L$_p$) for that set, as opposed to simply choosing the node with the lowest load. As a result, the same peer node is less likely to be repeatedly selected by a burst of overloaded nodes (e.g., which could potentially cause the selected peer node to become overloaded itself), as its load will likely deviate far enough from the average load relatively quickly upon being selected as a peer node, thus causing a different peer node to be selected by the next overloaded node. Moreover, this algorithm is scalable based on the total number of edge servers.

Once the peer node 320 is selected, the overloaded node 310 can then offload the processing of the next video segment in its receive buffer 314a to the peer node 320. In some embodiments, for example, the overloaded node 310 may deliver the offloaded video segment to the peer node 320 using a fast replication mechanism, which may be designed to achieve low latency using a "zero-copy" implementation that avoids memory copy operations. For example, the system memory 314a containing the video segment on the overloaded node 310 may be reused to replicate the video segment over the local network to the peer node 320 (e.g., using network transmission DMA acceleration). Moreover, if the video segment is still in the CPU cache of the overloaded node 310, it can be replicated directly from the CPU cache (e.g., using Intel Data Direct I/O) rather than from main memory.

In this manner, a video segment can be replicated directly from system memory 314 of the overloaded node 310 into system memory 324 of the peer node 320 (e.g., over the local network via the respective network interface controllers (NICs) 316, 326 of the edge nodes 310, 320). In particular, the replication may be performed directly between the CPU caches, main memories, persistent memories 315, and/or other forms of system memory 314, 324 of the respective edge nodes 310, 320. For example, in some embodiments, Intel Data Direct I/O may be leveraged to replicate the video segment directly between the CPU caches of the respective edge nodes 310, 320 (e.g., avoiding the latency associated with a subsequent CPU cache miss that requires a main memory access).

Moreover, various approaches can be used to replicate the video segment from system memory 314 over the local network, such as remote direct memory access (RDMA) and/or RDMA over Converged Ethernet (RoCE). For example, RDMA enables direct memory access (DMA) from the memory of one node into that of another node with no or minimal involvement from the CPUs 312, 322 and operating systems of the respective nodes 310, 320, while RDMA over Converged Ethernet (RoCE) is a network protocol that implements RDMA over an Ethernet network. RDMA supports zero-copy access by enabling the network interface controllers 316, 326 to transfer data directly to and from the appropriate memory locations 314, 324 on the respective nodes 310, 320, thus eliminating the need to copy the data between multiple memory locations within each individual node. As a result, RDMA can be used to achieve high-throughput and low-latency for replication of video segments between nodes 310, 320. Alternatively, a similar benefit can be achieved using a low-latency polling mode TCP/IP stack in user space, such as the Data Plane Development Kit (DPDK).

The overloaded edge node 310 also persists the video segment locally in low-latency persistent memory 315 (e.g., 3D XPoint persistent memory) before reclaiming the corresponding memory 314*a* in the receive buffer. In this manner, rather than dropping the video segment, the video segment is locally preserved and can be recovered in the event of a crash.

Further, in some embodiments, the replication mechanism discussed above may replicate the video segment directly from persistent memory 315 of the overloaded node 310 to the peer node 320. In some embodiments, for example, persistent memory 315 may be treated as part of the overall system memory 314 of a node 310. Accordingly, in order to persist the video segment file with low latency, the overloaded node 310 may leverage memory-to-memory DMA from the volatile domain (e.g., DRAM) to the non-volatile domain (e.g., persistent memory (PM)). This can be achieved using a software framework such as the Persistent Memory Development Kit (PMDK).

Persistent memory 315 is beneficial in this context because it is a cost-effective solution that combines the benefits of both volatile memory and non-volatile storage. For example, persistent memory 315 provides persistent data storage and increased storage capacity comparable to non-volatile storage, while also providing low-latency access comparable to volatile memory.

Figure 4:
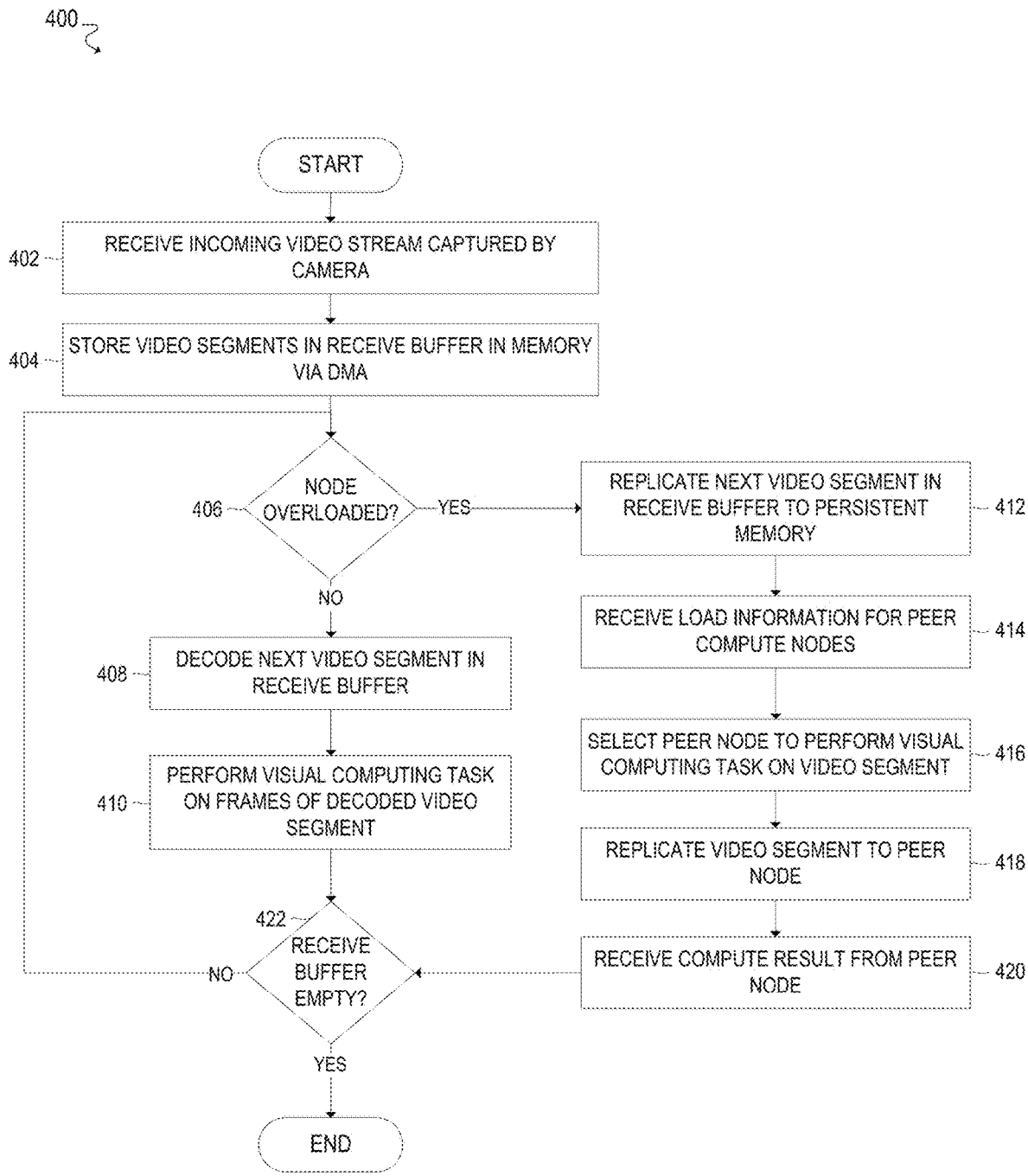
FIG. 4 illustrates a flowchart for an example embodiment of dynamically rebalancing edge video streaming resources.

FIG. 4 illustrates a flowchart 400 for an example embodiment of dynamically rebalancing edge video streaming resources. In some cases, for example, flowchart 400 may be implemented by an edge compute node based on the embodiments described throughout this disclosure (e.g., edge compute node 310 of FIG. 3).

The flowchart begins at block 402, where an incoming video stream captured by a camera is streamed to, and received by, an edge compute node. In general, an edge compute node can include any processing device deployed at or near the edge of a communication network (e.g., an edge compute server). Moreover, in some embodiments, the edge compute node and the camera may be connected to the same local network, along with other peer edge compute nodes and cameras. Further, video captured by the camera may be streamed to the edge compute node over the local network (e.g., using a streaming protocol). For example, the edge compute node may receive an incoming video stream over the local network (e.g., via a network interface and/or network interface controller (NIC)), which contains a sequence of video segments encapsulated in packets. Thus, based on the corresponding streaming protocol, the incoming packets may be reassembled into video segments.

The flowchart then proceeds to block 404 to store the video segments in a receive buffer in system memory of the edge compute node. In some embodiments, for example, a direct memory access (DMA) transfer may be performed to transfer the video segments from a network interface controller (NIC) of the edge compute node directly into the receive buffer in system memory. Moreover, in various embodiments, the system memory may include any combination of volatile and/or non-volatile memory, such as main memory (e.g., random access memory), processor caches, persistent memory (e.g., 3D XPoint memory), and so forth.

The flowchart then proceeds to block 406 to determine if the edge compute node is overloaded. In some cases, for example, the edge compute node may become overloaded while receiving and processing the incoming video stream. For example, while the edge node is processing video frames from decoded video segments, the edge node may continue receiving new video segments at a faster rate than the current video frames are being processed. As a result, the receive buffer (e.g., video segment memory) may be running low on memory or may otherwise become full, resulting in a resource overload. This resource overload may impede the edge node from continuing to receive video segments and process frames without eventually being forced to drop certain video segments.

Thus, in some embodiments, the edge node may detect when its resources become overloaded so it can offload certain processing to other peer compute nodes. For example, if a resource overload is detected, it may cause the edge node not to process the next video segment in the receive buffer, and instead offload the processing of that video segment to another peer node.

In various embodiments, for example, the edge node may detect a resource overload if the receive buffer is full, or if the receive buffer otherwise exceeds a memory utilization threshold (e.g., the percentage of the receive buffer's overall capacity that is currently being used exceeds a threshold). Alternatively, any other metric may also be used to detect when the edge node's resources have become overloaded.

If it is determined at block 406 that the edge node is not overloaded, the flowchart then proceeds to block 408 to decode the next video segment in the receive buffer. For example, the next video segment in the receive buffer is decoded into raw video frames, and the raw video frames are then stored back in memory.

The flowchart then proceeds to block 410 to perform a visual computing task on the raw video frames from the decoded video segment. The visual computing task, for example, can include any compute task (e.g., an operation, function, algorithm, and/or workload) that processes and/or interprets visual data, such as object identification and tracking, facial recognition, event detection, and so forth. The result of the visual computing task (e.g., an indication of identified objects, people, and/or events) may then be stored back in memory, and/or may be returned and/or reported to an appropriate destination, such as a database or management server, visual computing application, and so forth. The flowchart then proceeds to block 422, as described further below.

If it is determined at block 406 that the edge node is overloaded, however, the flowchart then proceeds to block 412, where the overloaded edge node replicates the next video segment in the receive buffer to persistent memory. In some embodiments, for example, the memory of the overloaded edge compute node may include both volatile memory (e.g., random access memory) and persistent memory (e.g., 3D XPoint memory). Moreover, the receive buffer containing the incoming video segments may be stored in the volatile memory. If the edge node becomes overloaded, however, the next video segment in the receive buffer may be replicated from the volatile memory to the persistent memory (e.g., using a DMA transfer), and the corresponding portion of the volatile memory may be subsequently freed or reclaimed.

The flowchart then proceeds to block 414, where the edge compute node receives load information for the other peer compute nodes on the local network. In various embodiments, for example, all edge compute nodes on the local network may broadcast or report their current load status to each other, either periodically or on demand. In this manner, the overloaded edge compute node receives load information from all of its peer compute nodes on the local network.

The flowchart then proceeds to block 416, where the edge compute node selects a peer compute node to perform the visual computing task on the video segment from block 414. In some embodiments, for example, the edge compute node uses a peer selection algorithm to select one of its peer compute nodes based on the load information received for the peer nodes at block 412.

First, the peer selection algorithm may identify a subset of peer compute nodes whose loads are the lowest. For example, the subset may contain a particular number or percentage of the full set of peer nodes whose loads are the lowest. In this manner, each peer node in the subset has a lower load than all other peer nodes that are not in the subset.

Next, an average load is computed for the subset of peer compute nodes based on the corresponding load information.

Finally, the peer node from the subset of peer compute nodes whose load is closest to the average is selected to perform the visual computing task.

The flowchart then proceeds to block 418, where the overloaded edge node replicates the video segment from block 414 to the selected peer compute node.

In some embodiments, for example, the video segment may be replicated using a low-latency replication mechanism, such as a zero-copy networking transfer using direct memory access (DMA) and/or remote direct memory access (RDMA), or a low-latency polling mode TCP/IP stack in user space, such as the Data Plane Development Kit (DPDK).

For example, in some embodiments, a DMA and/or RDMA transfer of the video segment may be performed directly from the system memory (e.g., processor cache, main memory, and/or persistent memory) of the overloaded edge compute node to the system memory (e.g., processor cache, main memory, and/or persistent memory) of the peer compute node. In some cases, for example, the video segment may be transferred directly from the processor cache of the overloaded node to the processor cache of the peer node (e.g., using Intel Data Direct I/O).

The flowchart then proceeds to block 420, where the overloaded edge node receives a compute result from the peer node. For example, after the peer node receives the replicated or offloaded video segment from the overloaded edge node, the peer node performs the visual computing task on the video segment, and the peer node then sends the compute result from the visual computing task (e.g., an indication of identified objects, people, and/or events) back to the overloaded edge node. The overloaded edge node may then store the compute result back in memory, and/or may return or report the compute result to an appropriate destination, such as a database or management server, visual computing application, and so forth.

The flowchart then proceeds to block 422 to determine whether the receive buffer is empty. If the receive buffer is not empty, the flowchart proceeds back to block 406 to continue processing video segments in the receive buffer. If the receive buffer is empty, however, the incoming stream has been fully processed, and the flowchart is complete.

At this point, the flowchart may be complete. In some embodiments, however, the flowchart may restart and/or certain blocks may be repeated. For example, in some embodiments, the flowchart may restart at block 402 to continue receiving and processing incoming video streams.

Example Internet-of-Things (IoT) Implementations

FIGS. 5-8 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 5:
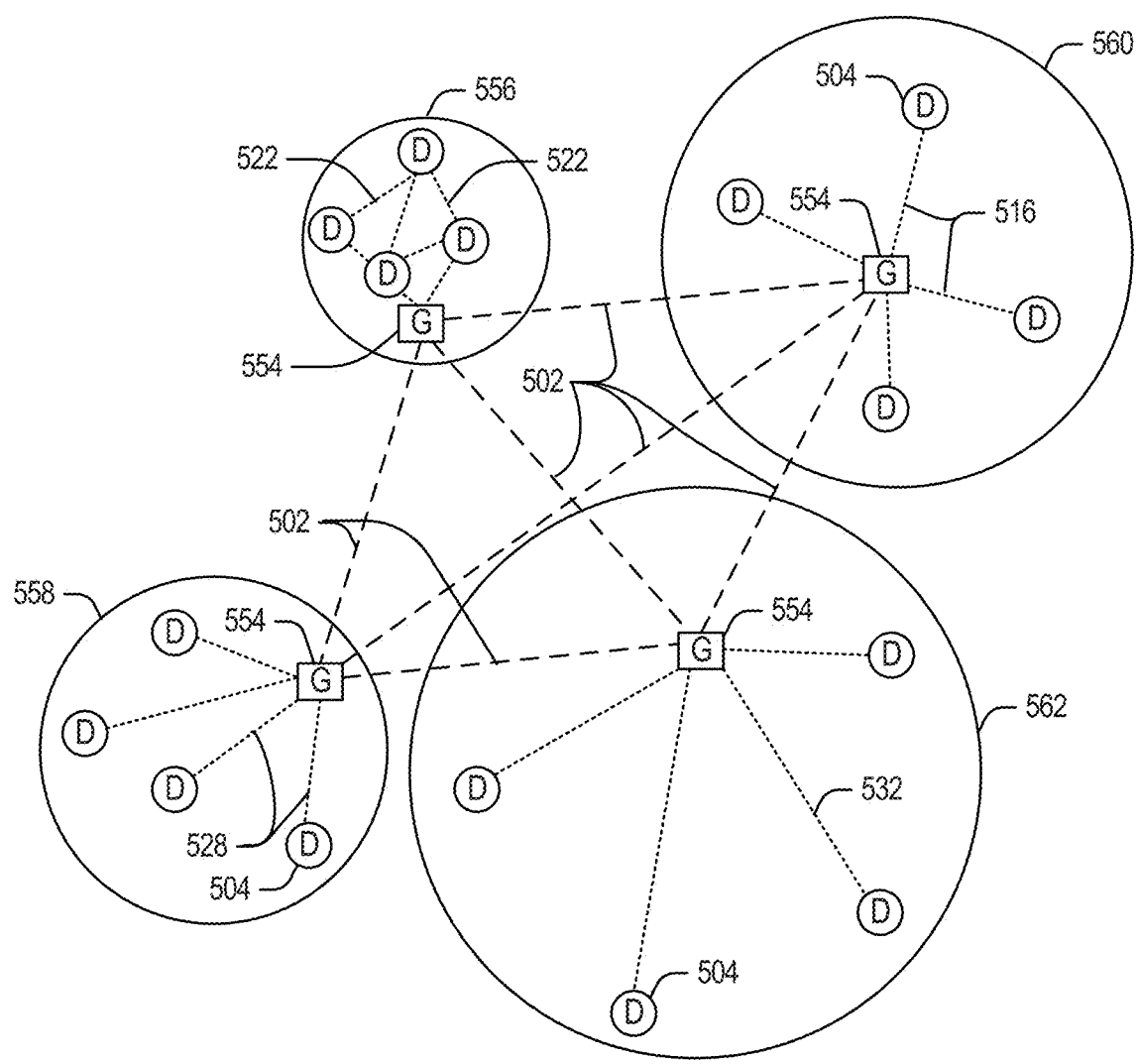
FIGS. 5, 6, 7, and 8 illustrate examples of Internet-of-Things (IoT) networks and architectures that can be used in accordance with certain embodiments.

FIG. 5 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 5-8, present a number of new challenges in a heterogeneous network of connectivity comprising a combination of wired and wireless technologies.

FIG. 5 specifically provides a simplified drawing of a domain topology that may be used for a number of internet-of-things (IoT) networks comprising IoT devices 504, with the IoT networks 556, 558, 560, 562, coupled through backbone links 502 to respective gateways 554. For example, a number of IoT devices 504 may communicate with a gateway 554, and with each other through the gateway 554. To simplify the drawing, not every IoT device 504, or communications link (e.g., link 516, 522, 528, or 532) is labeled. The backbone links 502 may include any number of wired or wireless technologies, including optical networks, and may be part of a local area network (LAN), a wide area network (WAN), or the Internet. Additionally, such communication links facilitate optical signal paths among both IoT devices 504 and gateways 554, including the use of MUXing/deMUXing components that facilitate interconnection of the various devices.

The network topology may include any number of types of IoT networks, such as a mesh network provided with the network 556 using Bluetooth low energy (BLE) links 522. Other types of IoT networks that may be present include a wireless local area network (WLAN) network 558 used to communicate with IoT devices 504 through IEEE 802.11 (Wi-Fi®) links 528, a cellular network 560 used to communicate with IoT devices 504 through an LTE/LTE-A (4G) or 5G cellular network, and a low-power wide area (LPWA) network 562, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 504, such as over the backbone links 502, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 556, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 558, for instance, may use systems that perform standards conversion to provide multi-standard connectivity, enabling IoT devices 504 using different protocols to communicate. Further systems may provide seamless interconnectivity across a multi-standard infrastructure comprising visible Internet resources and hidden Internet resources.

Communications in the cellular network 560, for instance, may be enhanced by systems that offload data, extend communications to more remote devices, or both. The LPWA network 562 may include systems that perform non-Internet protocol (IP) to IP interconnections, addressing, and routing. Further, each of the IoT devices 504 may include the appropriate transceiver for wide area communications with that device. Further, each IoT device 504 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 6 below.

Figure 6:
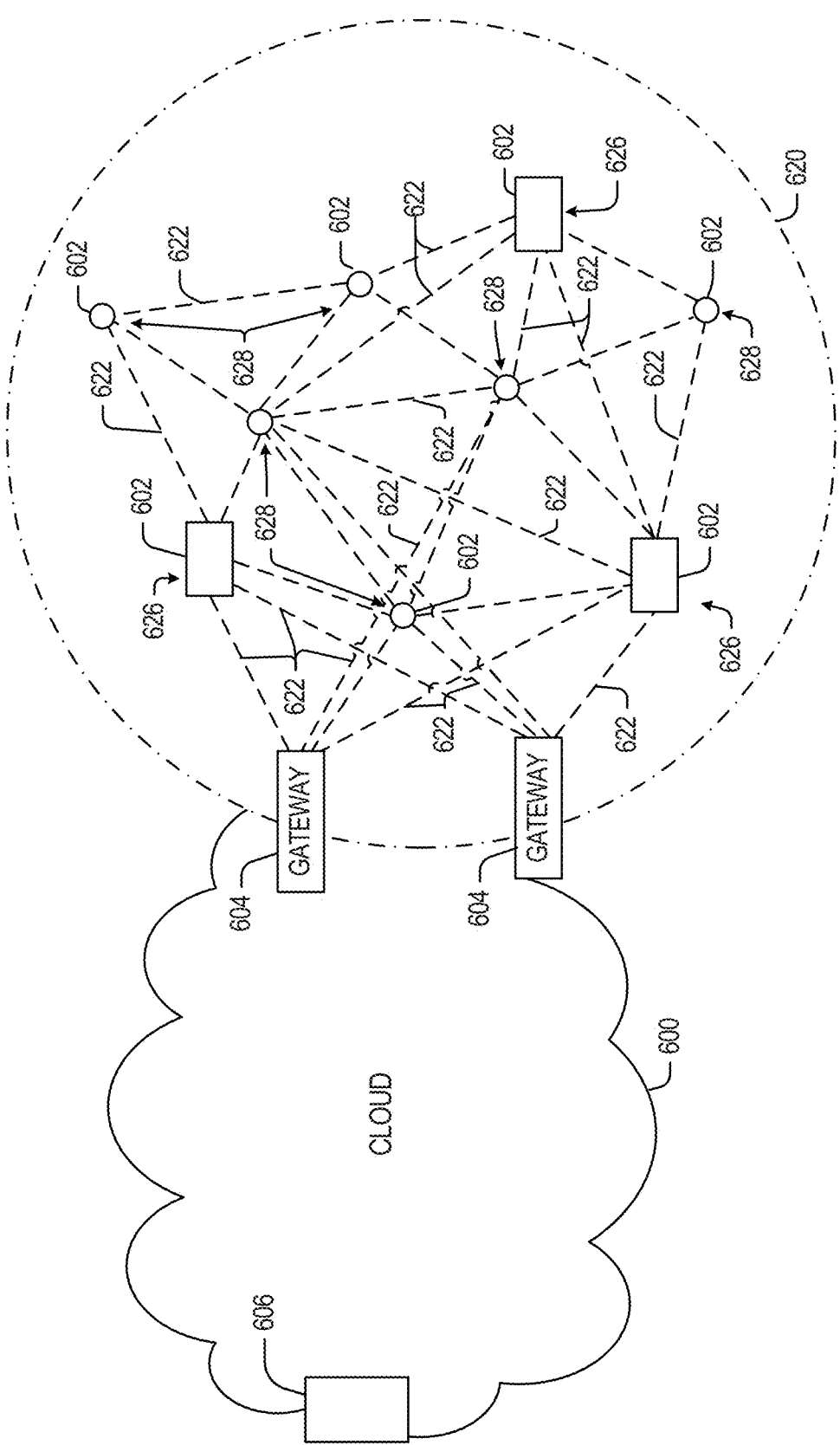

FIG. 6 illustrates a cloud computing network in communication with a mesh network of IoT devices (devices 602) operating as a fog device at the edge of the cloud computing network. The mesh network of IoT devices may be termed a fog 620, operating at the edge of the cloud 600. To simplify the diagram, not every IoT device 602 is labeled.

The fog 620 may be considered to be a massively interconnected network wherein a number of IoT devices 602 are in communications with each other, for example, by radio links 622. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 602 are shown in this example, gateways 604, data aggregators 626, and sensors 628, although any combinations of IoT devices 602 and functionality may be used. The gateways 604 may be edge devices that provide communications between the cloud 600 and the fog 620, and may also provide the backend process function for data obtained from sensors 628, such as motion data, flow data, temperature data, and the like. The data aggregators 626 may collect data from any number of the sensors 628, and perform the back-end processing function for the analysis. The results, raw data, or both may be passed along to the cloud 600 through the gateways 604. The sensors 628 may be full IoT devices 602, for example, capable of both collecting data and processing the data. In some cases, the sensors 628 may be more limited in functionality, for example, collecting the data and allowing the data aggregators 626 or gateways 604 to process the data.

Communications from any IoT device 602 may be passed along a convenient path (e.g., a most convenient path) between any of the IoT devices 602 to reach the gateways 604. In these networks, the number of interconnections provide substantial redundancy, allowing communications to be maintained, even with the loss of a number of IoT devices 602. Further, the use of a mesh network may allow IoT devices 602 that are very low power or located at a distance from infrastructure to be used, as the range to connect to another IoT device 602 may be much less than the range to connect to the gateways 604.

The fog 620 provided from these IoT devices 602 may be presented to devices in the cloud 600, such as a server 606, as a single device located at the edge of the cloud 600, e.g., a fog device. In this example, the alerts coming from the fog device may be sent without being identified as coming from a specific IoT device 602 within the fog 620. In this fashion, the fog 620 may be considered a distributed platform that provides computing and storage resources to perform processing or data-intensive tasks such as data analytics, data aggregation, and machine-learning, among others.

In some examples, the IoT devices 602 may be configured using an imperative programming style, e.g., with each IoT device 602 having a specific function and communication partners. However, the IoT devices 602 forming the fog device may be configured in a declarative programming style, allowing the IoT devices 602 to reconfigure their operations and communications, such as to determine needed resources in response to conditions, queries, and device failures. As an example, a query from a user located at a server 606 about the operations of a subset of equipment monitored by the IoT devices 602 may result in the fog 620 device selecting the IoT devices 602, such as particular sensors 628, needed to answer the query. The data from these sensors 628 may then be aggregated and analyzed by any combination of the sensors 628, data aggregators 626, or gateways 604, before being sent on by the fog 620 device to the server 606 to answer the query. In this example, IoT devices 602 in the fog 620 may select the sensors 628 used based on the query, such as adding data from flow sensors or temperature sensors. Further, if some of the IoT devices 602 are not operational, other IoT devices 602 in the fog 620 device may provide analogous data, if available.

Figure 7:
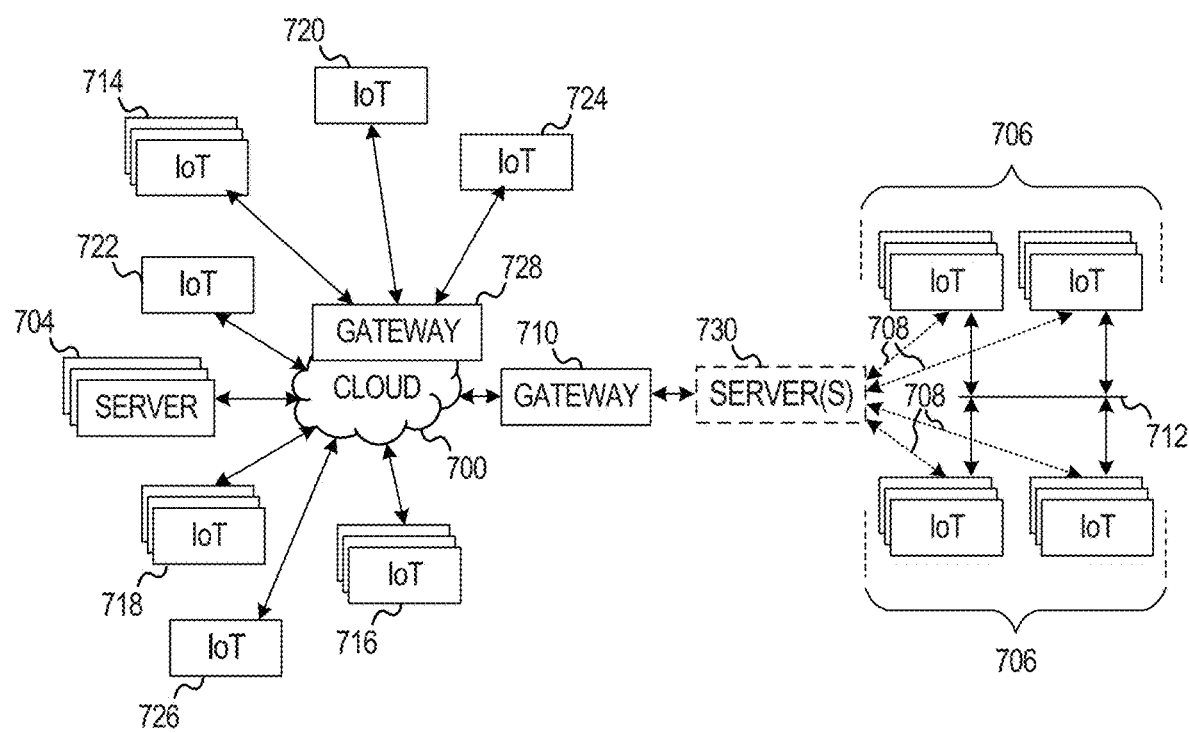

FIG. 7 illustrates a drawing of a cloud computing network, or cloud 700, in communication with a number of Internet of Things (IoT) devices. The cloud 700 may represent the Internet, or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the IoT devices to communicate with each other, such as through a local area network, a wireless local area network, and the like. The IoT devices may use another device, such as a gateway 710 or 728 to communicate with remote locations such as the cloud 700; the IoT devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as with the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog device or system (not shown, but depicted in FIG. 6), or a combination therein. The groups of IoT devices may be deployed in various residential, commercial, and industrial settings (including in both private or public environments).

As can be seen from FIG. 7, a large number of IoT devices may be communicating through the cloud 700. This may allow different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a fog device or system (e.g., as described above with reference to FIG. 6).

Figure 8:
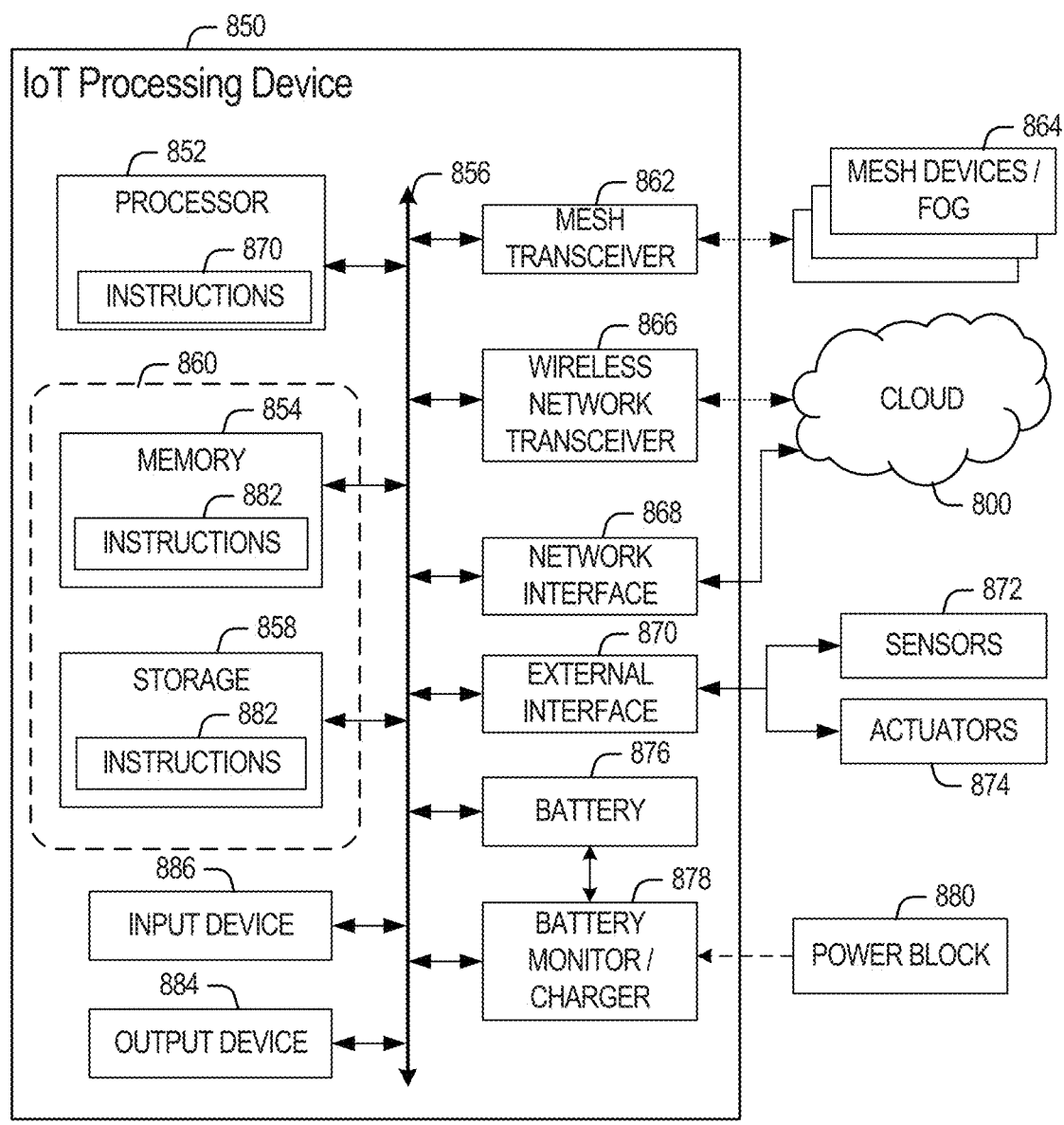

FIG. 8 is a block diagram of an example of components that may be present in an IoT device 850 for implementing the techniques described herein. The IoT device 850 may include any combinations of the components shown in the example or referenced in the disclosure above. The components may be implemented as ICs, portions thereof, discrete electronic devices, or other modules, logic, hardware, software, firmware, or a combination thereof adapted in the IoT device 850, or as components otherwise incorporated within a chassis of a larger system. Additionally, the block diagram of FIG. 8 is intended to depict a high-level view of components of the IoT device 850. However, some of the components shown may be omitted, additional components may be present, and different arrangement of the components shown may occur in other implementations.

The IoT device 850 may include a processor 852, which may be a microprocessor, a multi-core processor, a multi-threaded processor, an ultra-low voltage processor, an embedded processor, or other known processing element. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example, the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the IoT device 850 may communicate with close devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The IoT device 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

The interconnect 856 may couple the processor 852 to an external interface 870 that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the IoT device 850 to actuators 874, such as power switches, valve actuators, an audible sound generator, a visual warning device, and the like.

In some optional examples, various input/output (I/O) devices may be present within, or connected to, the IoT device 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 850.

A battery 876 may power the IoT device 850, although in examples in which the IoT device 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the IoT device 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2790 from Linear Technologies, an ADT7488A from ON Semiconductor of Phoenix Ariz., or an IC from the UCD90xxx family from Texas Instruments of Dallas, Tex. The battery monitor/charger 878 may communicate the information on the battery 876 to the processor 852 over the interconnect 856. The battery monitor/charger 878 may also include an analog-to-digital (ADC) convertor that allows the processor 852 to directly monitor the voltage of the battery 876 or the current flow from the battery 876. The battery parameters may be used to determine actions that the IoT device 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the IoT device 850. A wireless battery charging circuit, such as an LTC4020 chip from Linear Technologies of Milpitas, Calif., among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the IoT device 850. The processor 852 may access the non-transitory, machine readable medium 860 over the interconnect 856. For instance, the non-transitory, machine readable medium 860 may include storage units such as optical disks, flash drives, or any number of other hardware devices. The non-transitory, machine readable medium 860 may include instructions to direct the processor 852 to perform a specific sequence or flow of actions, for example, as described with respect to the flowchart(s) and diagram(s) of operations and functionality described throughout this disclosure.

Example Computing Architectures

Figure 9:
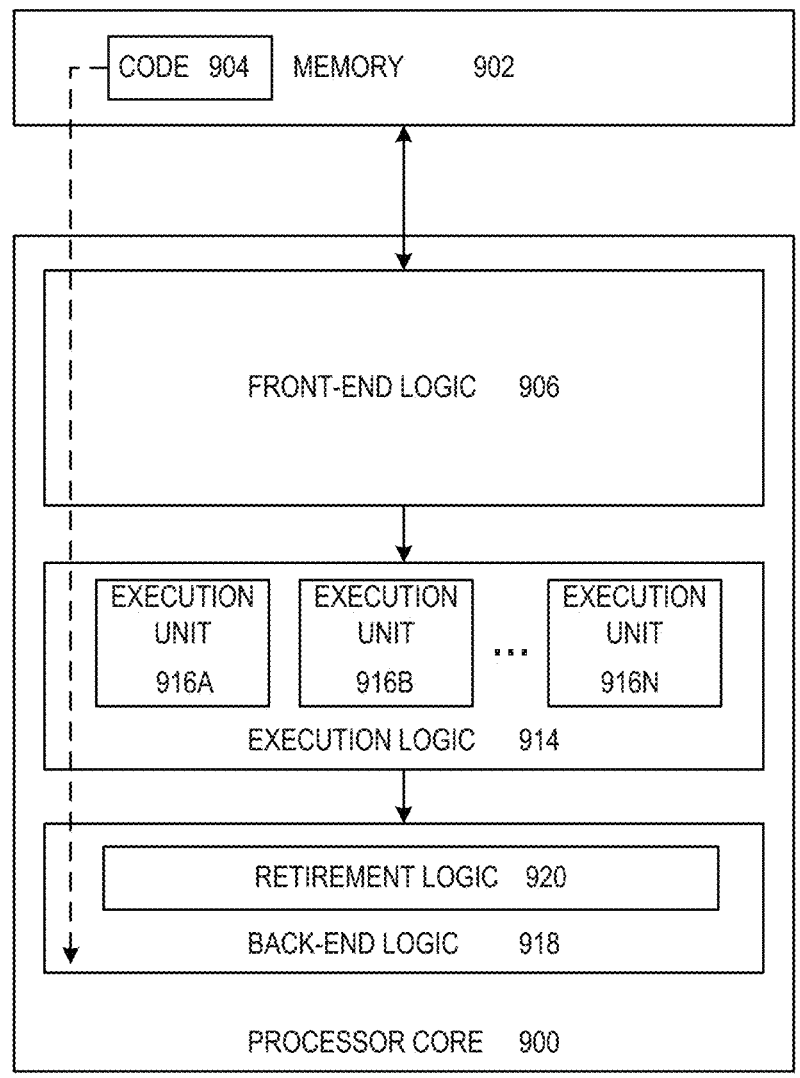
FIGS. 9 and 10 illustrate example computer architectures that can be used in accordance with certain embodiments.
Figure 10:
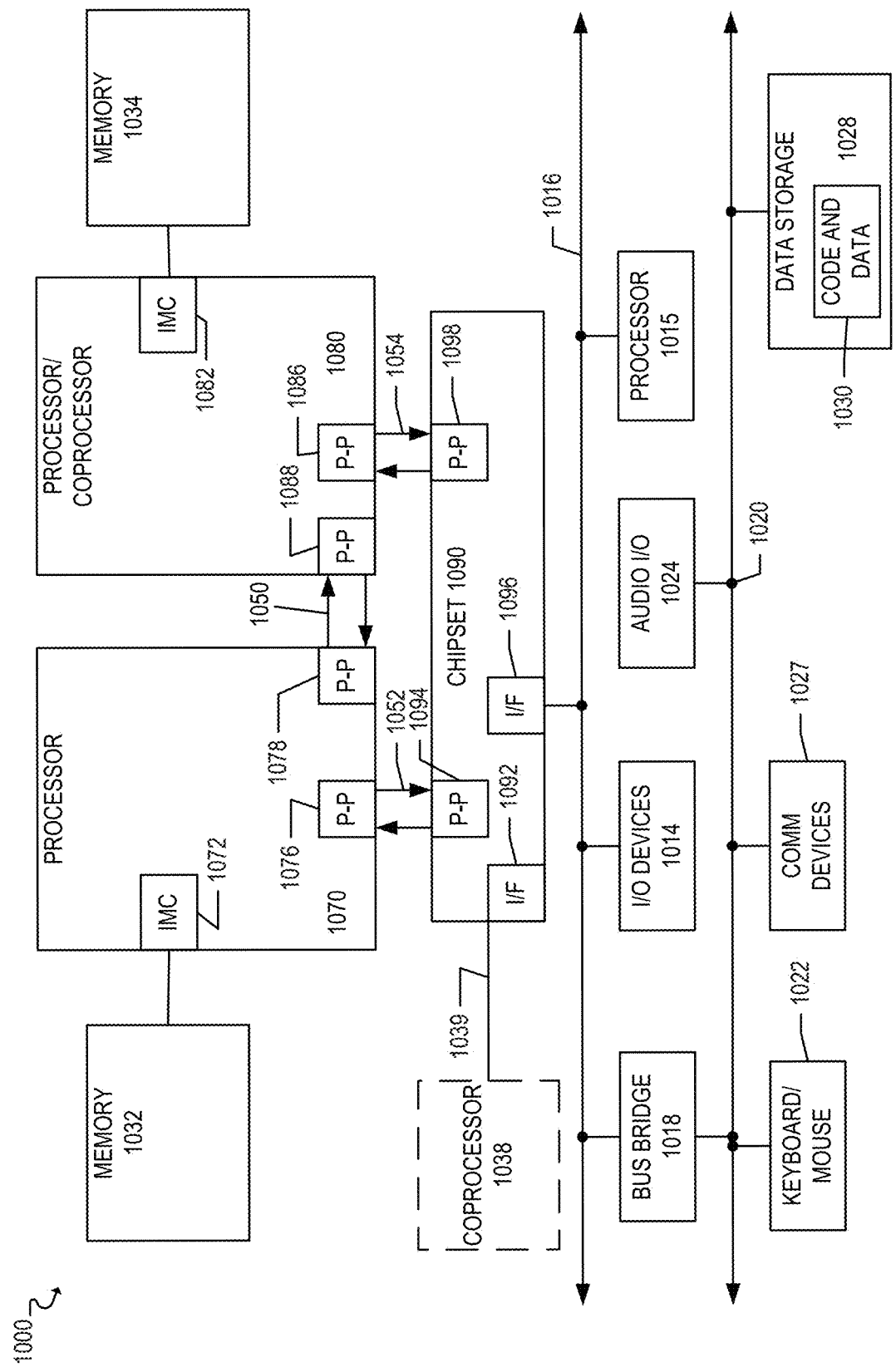

FIGS. 9 and 10 illustrate example computer processor architectures that can be used in accordance with embodiments disclosed herein. For example, in various embodiments, the computer architectures of FIGS. 9 and 10 may be used to implement the functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 9 illustrates a block diagram for an example embodiment of a processor 900. Processor 900 is an example of a type of hardware device that can be used in connection with the embodiments described throughout this disclosure. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 may also include register renaming logic and scheduling logic, which generally allocate resources and queue the operation corresponding to the instruction for execution.

Processor 900 can also include execution logic 914 having a set of execution units 916*a*, 916*b*, 916*n*, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a block diagram for an example embodiment of a multiprocessor 1000. As shown in FIG. 10, multiprocessor system 1000 is a point-to-point interconnect system, and includes a first processor 1070 and a second processor 1080 coupled via a point-to-point interconnect 1050. In some embodiments, each of processors 1070 and 1080 may be some version of processor 900 of FIG. 9.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of this disclosure is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

All or part of any component of FIG. 10 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The machine-readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine readable instructions and/or program(s) when stored or otherwise at rest or in transit.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an edge compute node, comprising: a network interface to communicate over a network; a memory; and processing circuitry to: receive, via the network interface, an incoming video stream captured by a camera, wherein the incoming video stream comprises a plurality of video segments; store the plurality of video segments in a receive buffer in the memory; perform a visual computing task on a first video segment in the receive buffer; detect a resource overload on the edge compute node, wherein the resource overload causes the edge compute node not to perform the visual computing task on a second video segment in the receive buffer; receive, via the network interface, load information corresponding to a plurality of peer compute nodes; select a peer compute node to perform the visual computing task on the second video segment, wherein the peer compute node is selected from the plurality of peer compute nodes based on the load information; replicate, via the network interface, the second video segment from the edge compute node to the peer compute node; and receive, via the network interface, a compute result from the peer compute node, wherein the compute result is based on the peer compute node performing the visual computing task on the second video segment.

In one example embodiment of an edge compute node, the processing circuitry to select the peer compute node to perform the visual computing task on the second video segment is further to: identify, based on the load information, a subset of peer compute nodes from the plurality of peer compute nodes, wherein each peer compute node in the subset of peer compute nodes has a lower load than each peer compute node from the plurality of peer compute nodes that is not in the subset of peer compute nodes; compute, based on the load information, an average load for the subset of peer compute nodes; and select, from the subset of peer compute nodes, the peer compute node whose load is closest to the average load.

In one example embodiment of an edge compute node, the processing circuitry to replicate, via the network interface, the second video segment from the edge compute node to the peer compute node is further to: perform a direct memory access transfer of the second video segment from the edge compute node to the peer compute node.

In one example embodiment of an edge compute node, the processing circuitry to perform the direct memory access transfer of the second video segment from the edge compute node to the peer compute node is further to: perform the direct memory access transfer of the second video segment from a first processor cache of the edge compute node to a second processor cache of the peer compute node.

In one example embodiment of an edge compute node, the direct memory access transfer comprises a remote direct memory access (RDMA) transfer.

In one example embodiment of an edge compute node, the processing circuitry to replicate, via the network interface, the second video segment from the edge compute node to the peer compute node is further to: perform a zero-copy networking transfer of the second video segment from the edge compute node to the peer compute node.

In one example embodiment of an edge compute node, the processing circuitry to detect the resource overload on the edge compute node is further to: determine that the receive buffer is full; or determine that the receive buffer exceeds a memory utilization threshold.

In one example embodiment of an edge compute node: the memory comprises a volatile memory and a persistent memory, wherein the receive buffer is stored in the volatile memory; and based at least in part on detecting the resource overload on the edge compute node, the processing circuitry is further to: replicate the second video segment from the receive buffer in the volatile memory to the persistent memory; and reclaim a portion of the volatile memory corresponding to the second video segment.

In one example embodiment of an edge compute node, the persistent memory comprises 3D XPoint memory.

In one example embodiment of an edge compute node, the processing circuitry to store the plurality of video segments in the receive buffer in the memory is further to: perform a direct memory access transfer of the plurality of video segments to the receive buffer in the memory.

One or more embodiments may include at least one non-transitory machine accessible storage medium having instructions stored thereon, wherein the instructions, when executed on a machine, cause the machine to: receive, via a network interface of an edge compute node, an incoming video stream captured by a camera, wherein the incoming video stream comprises a plurality of video segments; store the plurality of video segments in a receive buffer in a memory of the edge compute node; perform a visual computing task on a first video segment in the receive buffer; detect a resource overload on the edge compute node, wherein the resource overload causes the edge compute node not to perform the visual computing task on a second video segment in the receive buffer; receive, via the network interface, load information corresponding to a plurality of peer compute nodes; select a peer compute node to perform the visual computing task on the second video segment, wherein the peer compute node is selected from the plurality of peer compute nodes based on the load information; replicate, via the network interface, the second video segment from the edge compute node to the peer compute node; and receive, via the network interface, a compute result from the peer compute node, wherein the compute result is based on the peer compute node performing the visual computing task on the second video segment.

In one example embodiment of a storage medium, the instructions that cause the machine to select the peer compute node to perform the visual computing task on the second video segment further cause the machine to: identify, based on the load information, a subset of peer compute nodes from the plurality of peer compute nodes, wherein each peer compute node in the subset of peer compute nodes has a lower load than each peer compute node from the plurality of peer compute nodes that is not in the subset of peer compute nodes; compute, based on the load information, an average load for the subset of peer compute nodes; and select, from the subset of peer compute nodes, the peer compute node whose load is closest to the average load.

In one example embodiment of a storage medium, the instructions that cause the machine to replicate, via the network interface, the second video segment from the edge compute node to the peer compute node further cause the machine to: perform a direct memory access transfer of the second video segment from the edge compute node to the peer compute node.

In one example embodiment of a storage medium, the instructions that cause the machine to perform the direct memory access transfer of the second video segment from the edge compute node to the peer compute node further cause the machine to: perform the direct memory access transfer of the second video segment from a first processor cache of the edge compute node to a second processor cache of the peer compute node.

In one example embodiment of a storage medium, the direct memory access transfer comprises a remote direct memory access (RDMA) transfer.

In one example embodiment of a storage medium, the instructions that cause the machine to detect the resource overload on the edge compute node further cause the machine to: determine that the receive buffer is full; or determine that the receive buffer exceeds a memory utilization threshold.

In one example embodiment of a storage medium: the memory comprises a volatile memory and a persistent memory, wherein the receive buffer is stored in the volatile memory; and based at least in part on detecting the resource overload on the edge compute node, the instructions further cause the machine to: replicate the second video segment from the receive buffer in the volatile memory to the persistent memory; and reclaim a portion of the volatile memory corresponding to the second video segment.

One or more embodiments may include a method, comprising: receiving, via a network interface of an edge compute node, an incoming video stream captured by a camera, wherein the incoming video stream comprises a plurality of video segments; storing the plurality of video segments in a receive buffer in a memory of the edge compute node; performing a visual computing task on a first video segment in the receive buffer; detecting a resource overload on the edge compute node, wherein the resource overload causes the edge compute node not to perform the visual computing task on a second video segment in the receive buffer; receiving, via the network interface, load information corresponding to a plurality of peer compute nodes; selecting a peer compute node to perform the visual computing task on the second video segment, wherein the peer compute node is selected from the plurality of peer compute nodes based on the load information; replicating, via the network interface, the second video segment from the edge compute node to the peer compute node, wherein a direct memory access transfer of the second video segment is performed between the edge compute node and the peer compute node; and receiving, via the network interface, a compute result from the peer compute node, wherein the compute result is based on the peer compute node performing the visual computing task on the second video segment.

In one example embodiment of a method, selecting the peer compute node to perform the visual computing task on the second video segment comprises: identifying, based on the load information, a subset of peer compute nodes from the plurality of peer compute nodes, wherein each peer compute node in the subset of peer compute nodes has a lower load than each peer compute node from the plurality of peer compute nodes that is not in the subset of peer compute nodes; computing, based on the load information, an average load for the subset of peer compute nodes; and selecting, from the subset of peer compute nodes, the peer compute node whose load is closest to the average load.

In one example embodiment of a method, replicating, via the network interface, the second video segment from the edge compute node to the peer compute node comprises: performing the direct memory access transfer of the second video segment from a first processor cache of the edge compute node to a second processor cache of the peer compute node.

In one example embodiment of a method: the memory comprises a volatile memory and a persistent memory, wherein the receive buffer is stored in the volatile memory; and based at least in part on detecting the resource overload on the edge compute node, the method further comprises: replicating the second video segment from the receive buffer in the volatile memory to the persistent memory; and reclaiming a portion of the volatile memory corresponding to the second video segment.

One or more embodiments may include a system, comprising: a camera; and an edge compute node, comprising: a network interface to communicate over a network; a memory; processing circuitry to: receive, via the network interface, an incoming video stream captured by the camera, wherein the incoming video stream comprises a plurality of video segments; store the plurality of video segments in a receive buffer in the memory; perform a visual computing task on a first video segment in the receive buffer; detect a resource overload on the edge compute node, wherein the resource overload causes the edge compute node not to perform the visual computing task on a second video segment in the receive buffer; receive, via the network interface, load information corresponding to a plurality of peer compute nodes; select a peer compute node to perform the visual computing task on the second video segment, wherein the peer compute node is selected from the plurality of peer compute nodes based on the load information; replicate, via the network interface, the second video segment from the edge compute node to the peer compute node, wherein a remote direct memory access (RDMA) transfer of the second video segment is performed between the edge compute node and the peer compute node; and receive, via the network interface, a compute result from the peer compute node, wherein the compute result is based on the peer compute node performing the visual computing task on the second video segment.

In one example embodiment of a system, the processing circuitry to select the peer compute node to perform the visual computing task on the second video segment is further to: identify, based on the load information, a subset of peer compute nodes from the plurality of peer compute nodes, wherein each peer compute node in the subset of peer compute nodes has a lower load than each peer compute node from the plurality of peer compute nodes that is not in the subset of peer compute nodes; compute, based on the load information, an average load for the subset of peer compute nodes; and select, from the subset of peer compute nodes, the peer compute node whose load is closest to the average load.

In one example embodiment of a system, the processing circuitry to replicate, via the network interface, the second video segment from the edge compute node to the peer compute node is further to: perform the RDMA transfer of the second video segment from a first processor cache of the edge compute node to a second processor cache of the peer compute node.

In one example embodiment of a system: the memory comprises a volatile memory and a persistent memory, wherein the receive buffer is stored in the volatile memory; and based at least in part on detecting the resource overload on the edge compute node, the processing circuitry is further to: replicate the second video segment from the receive buffer in the volatile memory to the persistent memory; and reclaim a portion of the volatile memory corresponding to the second video segment.

What is claimed is:

1. An edge compute node, comprising:
   a network interface to communicate over a network;
   a memory; and
   processing circuitry to:
      receive, via the network interface, an incoming video stream captured by a camera, wherein the incoming video stream comprises a plurality of video segments;
      store the plurality of video segments in a receive buffer in the memory;
      perform a visual computing task on a first video segment in the receive buffer;
      detect a resource overload on the edge compute node, wherein the resource overload causes the edge compute node not to perform the visual computing task on a second video segment in the receive buffer;
      receive, via the network interface, load information corresponding to a plurality of peer compute nodes;
      select a peer compute node to perform the visual computing task on the second video segment, wherein the peer compute node is selected from the plurality of peer compute nodes based on the load information;
      replicate, via the network interface, the second video segment from the edge compute node to the peer compute node; and
      receive, via the network interface, a compute result from the peer compute node, wherein the compute result is based on the peer compute node performing the visual computing task on the second video segment.

2. The edge compute node of claim 1, wherein the processing circuitry to select the peer compute node to perform the visual computing task on the second video segment is further to:
   identify, based on the load information, a subset of peer compute nodes from the plurality of peer compute nodes, wherein each peer compute node in the subset of peer compute nodes has a lower load than each peer compute node from the plurality of peer compute nodes that is not in the subset of peer compute nodes;
   compute, based on the load information, an average load for the subset of peer compute nodes; and
   select, from the subset of peer compute nodes, the peer compute node whose load is closest to the average load.

3. The edge compute node of claim 1, wherein the processing circuitry to replicate, via the network interface, the second video segment from the edge compute node to the peer compute node is further to:
   perform a direct memory access transfer of the second video segment from the edge compute node to the peer compute node.

4. The edge compute node of claim 3, wherein the processing circuitry to perform the direct memory access transfer of the second video segment from the edge compute node to the peer compute node is further to:
   perform the direct memory access transfer of the second video segment from a first processor cache of the edge compute node to a second processor cache of the peer compute node.

5. The edge compute node of claim 3, wherein the direct memory access transfer comprises a remote direct memory access (RDMA) transfer.

6. The edge compute node of claim 1, wherein the processing circuitry to replicate, via the network interface, the second video segment from the edge compute node to the peer compute node is further to:
   perform a zero-copy networking transfer of the second video segment from the edge compute node to the peer compute node.

7. The edge compute node of claim 1, wherein the processing circuitry to detect the resource overload on the edge compute node is further to:
   determine that the receive buffer is full; or
   determine that the receive buffer exceeds a memory utilization threshold.

8. The edge compute node of claim 1, wherein:
   the memory comprises a volatile memory and a persistent memory, wherein the receive buffer is stored in the volatile memory; and
   based at least in part on detecting the resource overload on the edge compute node, the processing circuitry is further to:
      replicate the second video segment from the receive buffer in the volatile memory to the persistent memory; and
      reclaim a portion of the volatile memory corresponding to the second video segment.

9. The edge compute node of claim 8, wherein the persistent memory comprises 3D XPoint memory.

10. The edge compute node of claim 1, wherein the processing circuitry to store the plurality of video segments in the receive buffer in the memory is further to:
    perform a direct memory access transfer of the plurality of video segments to the receive buffer in the memory.

11. At least one non-transitory machine accessible storage medium having instructions stored thereon, wherein the instructions, when executed on a machine, cause the machine to:
- receive, via a network interface of an edge compute node, an incoming video stream captured by a camera, wherein the incoming video stream comprises a plurality of video segments;
- store the plurality of video segments in a receive buffer in a memory of the edge compute node;
- perform a visual computing task on a first video segment in the receive buffer;
- detect a resource overload on the edge compute node, wherein the resource overload causes the edge compute node not to perform the visual computing task on a second video segment in the receive buffer;
- receive, via the network interface, load information corresponding to a plurality of peer compute nodes;
- select a peer compute node to perform the visual computing task on the second video segment, wherein the peer compute node is selected from the plurality of peer compute nodes based on the load information;
- replicate, via the network interface, the second video segment from the edge compute node to the peer compute node; and
- receive, via the network interface, a compute result from the peer compute node, wherein the compute result is based on the peer compute node performing the visual computing task on the second video segment.

12. The storage medium of claim 11, wherein the instructions that cause the machine to select the peer compute node to perform the visual computing task on the second video segment further cause the machine to:
- identify, based on the load information, a subset of peer compute nodes from the plurality of peer compute nodes, wherein each peer compute node in the subset of peer compute nodes has a lower load than each peer compute node from the plurality of peer compute nodes that is not in the subset of peer compute nodes;
- compute, based on the load information, an average load for the subset of peer compute nodes; and
- select, from the subset of peer compute nodes, the peer compute node whose load is closest to the average load.

13. The storage medium of claim 11, wherein the instructions that cause the machine to replicate, via the network interface, the second video segment from the edge compute node to the peer compute node further cause the machine to:
- perform a direct memory access transfer of the second video segment from the edge compute node to the peer compute node.

14. The storage medium of claim 13, wherein the instructions that cause the machine to perform the direct memory access transfer of the second video segment from the edge compute node to the peer compute node further cause the machine to:
- perform the direct memory access transfer of the second video segment from a first processor cache of the edge compute node to a second processor cache of the peer compute node.

15. The storage medium of claim 13, wherein the direct memory access transfer comprises a remote direct memory access (RDMA) transfer.

16. The storage medium of claim 11, wherein the instructions that cause the machine to detect the resource overload on the edge compute node further cause the machine to:
- determine that the receive buffer is full; or
- determine that the receive buffer exceeds a memory utilization threshold.

17. The storage medium of claim 11, wherein:
- the memory comprises a volatile memory and a persistent memory, wherein the receive buffer is stored in the volatile memory; and
- based at least in part on detecting the resource overload on the edge compute node, the instructions further cause the machine to:
  - replicate the second video segment from the receive buffer in the volatile memory to the persistent memory; and
  - reclaim a portion of the volatile memory corresponding to the second video segment.

18. A method, comprising:
- receiving, via a network interface of an edge compute node, an incoming video stream captured by a camera, wherein the incoming video stream comprises a plurality of video segments;
- storing the plurality of video segments in a receive buffer in a memory of the edge compute node;
- performing a visual computing task on a first video segment in the receive buffer;
- detecting a resource overload on the edge compute node, wherein the resource overload causes the edge compute node not to perform the visual computing task on a second video segment in the receive buffer;
- receiving, via the network interface, load information corresponding to a plurality of peer compute nodes;
- selecting a peer compute node to perform the visual computing task on the second video segment, wherein the peer compute node is selected from the plurality of peer compute nodes based on the load information;
- replicating, via the network interface, the second video segment from the edge compute node to the peer compute node, wherein a direct memory access transfer of the second video segment is performed between the edge compute node and the peer compute node; and
- receiving, via the network interface, a compute result from the peer compute node, wherein the compute result is based on the peer compute node performing the visual computing task on the second video segment.

19. The method of claim 18, wherein selecting the peer compute node to perform the visual computing task on the second video segment comprises:
- identifying, based on the load information, a subset of peer compute nodes from the plurality of peer compute nodes, wherein each peer compute node in the subset of peer compute nodes has a lower load than each peer compute node from the plurality of peer compute nodes that is not in the subset of peer compute nodes;
- computing, based on the load information, an average load for the subset of peer compute nodes; and
- selecting, from the subset of peer compute nodes, the peer compute node whose load is closest to the average load.

20. The method of claim 18, wherein replicating, via the network interface, the second video segment from the edge compute node to the peer compute node comprises:
- performing the direct memory access transfer of the second video segment from a first processor cache of the edge compute node to a second processor cache of the peer compute node.

21. The method of claim 18, wherein:
- the memory comprises a volatile memory and a persistent memory, wherein the receive buffer is stored in the volatile memory; and based at least in part on detecting the resource overload on the edge compute node, the method further comprises:
replicating the second video segment from the receive buffer in the volatile memory to the persistent memory; and
reclaiming a portion of the volatile memory corresponding to the second video segment.

22. A system, comprising:
a camera; and
an edge compute node, comprising:
a network interface to communicate over a network;
a memory;
processing circuitry to:
receive, via the network interface, an incoming video stream captured by the camera, wherein the incoming video stream comprises a plurality of video segments;
store the plurality of video segments in a receive buffer in the memory;
perform a visual computing task on a first video segment in the receive buffer;
detect a resource overload on the edge compute node, wherein the resource overload causes the edge compute node not to perform the visual computing task on a second video segment in the receive buffer;
receive, via the network interface, load information corresponding to a plurality of peer compute nodes;
select a peer compute node to perform the visual computing task on the second video segment, wherein the peer compute node is selected from the plurality of peer compute nodes based on the load information;
replicate, via the network interface, the second video segment from the edge compute node to the peer compute node, wherein a remote direct memory access (RDMA) transfer of the second video segment is performed between the edge compute node and the peer compute node; and
receive, via the network interface, a compute result from the peer compute node, wherein the compute result is based on the peer compute node performing the visual computing task on the second video segment.

23. The system of claim 22, wherein the processing circuitry to select the peer compute node to perform the visual computing task on the second video segment is further to:
identify, based on the load information, a subset of peer compute nodes from the plurality of peer compute nodes, wherein each peer compute node in the subset of peer compute nodes has a lower load than each peer compute node from the plurality of peer compute nodes that is not in the subset of peer compute nodes;
compute, based on the load information, an average load for the subset of peer compute nodes; and
select, from the subset of peer compute nodes, the peer compute node whose load is closest to the average load.

24. The system of claim 22, wherein the processing circuitry to replicate, via the network interface, the second video segment from the edge compute node to the peer compute node is further to:
perform the RDMA transfer of the second video segment from a first processor cache of the edge compute node to a second processor cache of the peer compute node.

25. The system of claim 22, wherein:
the memory comprises a volatile memory and a persistent memory, wherein the receive buffer is stored in the volatile memory; and
based at least in part on detecting the resource overload on the edge compute node, the processing circuitry is further to:
replicate the second video segment from the receive buffer in the volatile memory to the persistent memory; and
reclaim a portion of the volatile memory corresponding to the second video segment.

* * * * *